(12) United States Patent
Miotto et al.

(10) Patent No.: US 6,406,093 B1
(45) Date of Patent: Jun. 18, 2002

(54) ATTACHMENT FOR SEAT ASSEMBLY

(75) Inventors: Ronald L. Miotto, Romulus; Kenneth R. Parrish, Detroit; John M. Pierce, Clarkston; David R. Fabry, Grosse Pointe Park; Benedict J. Messina, Warren; Cathy A. Sadler, Farmington Hills, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/537,612

(22) Filed: Mar. 29, 2000

(51) Int. Cl.⁷ .............................................. A47C 31/02
(52) U.S. Cl. ................. 297/218.5; 297/218.3; 297/440.11
(58) Field of Search ............... 297/218.1, 218.3, 297/218.5, 219.1, 228.13, 440.11; 24/336

(56) References Cited

U.S. PATENT DOCUMENTS

| | | |
|---|---|---|
| 1,495,335 A | 5/1924 | Lichter |
| 4,492,408 A | 1/1985 | Lohr |
| 5,401,075 A | 3/1995 | Venuto et al. ............ 297/218.2 |
| 5,439,271 A * | 8/1995 | Ryan ........................ 297/218.5 |
| 5,478,134 A * | 12/1995 | Bernard et al. ........... 297/218.1 |
| 5,582,463 A | 12/1996 | Linder et al. |
| 5,586,807 A | 12/1996 | Taggart .................... 297/218.5 |
| 5,601,333 A | 2/1997 | Bostrom et al. |
| 5,718,478 A * | 2/1998 | Allison ..................... 297/218.1 |
| 5,820,213 A | 10/1998 | Severinski ................ 297/218.5 |

\* cited by examiner

*Primary Examiner*—Peter R. Brown
(74) *Attorney, Agent, or Firm*—MacMillan, Sobanski & Todd, LLC

(57) ABSTRACT

A seat assembly includes a seat structural member and a clip having first and second hook portions. The first hook portion of the clip is attached to the structural member. The seat assembly also includes a first trim material having an edge attached to the clip. Preferably, the first trim material is an elastomeric material. The seat assembly further includes a second trim material having a first edge attached to the first trim material and a second edge attached to the second hook portion.

17 Claims, 6 Drawing Sheets

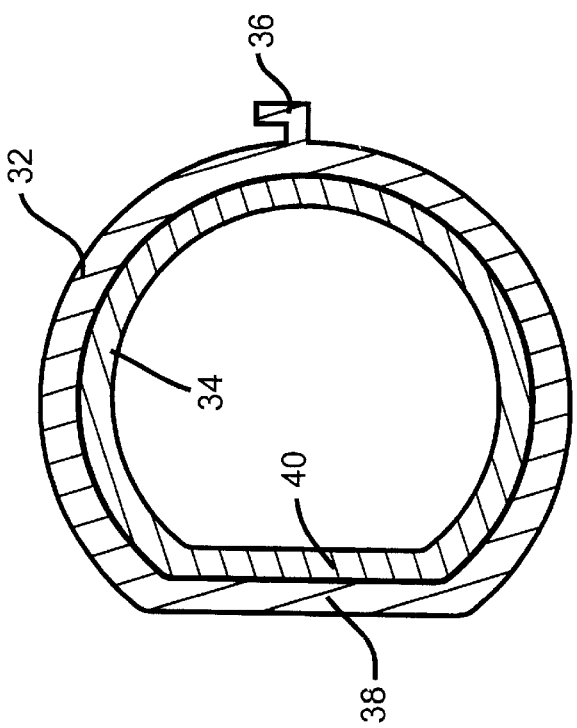
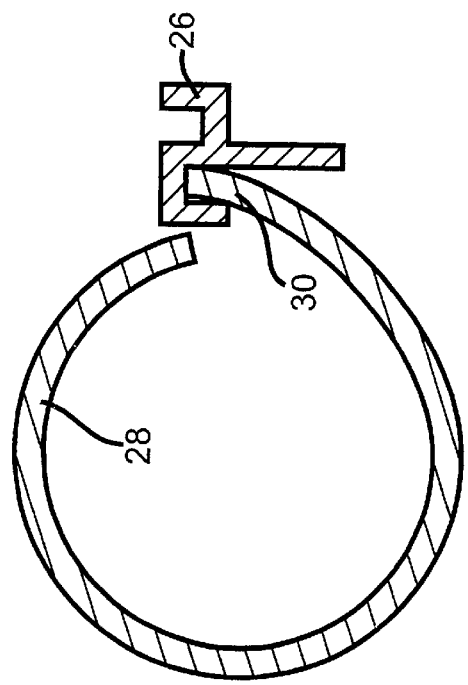
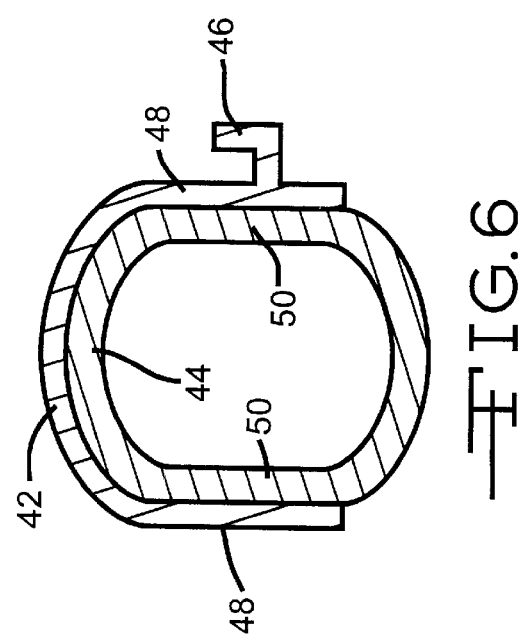
FIG. 5
FIG. 4
FIG. 6

ATTACHMENT FOR SEAT ASSEMBLY

BACKGROUND OF THE INVENTION

This invention relates in general to a seat construction, and in particular to an attachment of an elastomeric material and a trim material to a seat frame member.

One way of constructing a seat is to provide a tubular seat frame upon which a suspension mat is supported. A seat construction of this type is disclosed in U.S. Pat. No. 5,582,463 to Linder et al. The seat includes a plurality of frame members defining the outer periphery of the seat. A suspension mat extends between the frame members to define a seating surface. The suspension mat is made of a stretchable material and is attached to the seat frame with J-clip fasteners. The fasteners have a J-shaped cross-section and are sewn to the edge of the mat, exposing a hook-shaped portion of the fastener. The hook portion engages with a lip formed on the frame of the seat. The suspension mat functions as both a suspension and a trim for the seating surface of the seat. Such a construction provides a lightweight and low cost seat that can be used, for example, as a vehicle seat, a home furniture seat, an office furniture seat, or a lawn furniture seat. However, such a seat construction does not provide for integral means for attaching padding or bolster cushions to the seat frame to improve the comfort of the seat, or for attaching a conventional trim material to the seat frame to improve the seat's appearance.

SUMMARY OF THE INVENTION

This invention relates to a seat assembly including a seat structural member such as a frame member. The seat assembly also includes a clip having first and second hook portions. The first hook portion of the clip is attached to the structural member. The seat assembly also includes a first trim material having an edge attached to the clip. Preferably, the first trim material is an elastomeric material. The seat assembly further includes a second trim material having a first edge attached to the first trim material and a second edge attached to the second hook portion of the clip.

In another embodiment, the invention relates to a seat assembly including a seat structural member such as a frame member. The seat assembly also includes a clip having oppositely extending first and second hook portions. Preferably, the first and second hook portions form an S-shape. The first hook portion of the clip is attached to the structural member. The seat assembly also includes a trim material having an edge attached directly to the clip.

In another embodiment, the invention relates to a seat assembly including a seat structural member such as a frame member. The seat assembly also includes a clip having first and second hook portions. The first hook portion of the clip is attached to the structural member. The seat assembly also includes an elastomeric material having an edge attached to the clip. Preferably, the elastomeric material functions as both a trim and a suspension of the seat assembly.

In a further embodiment, the invention relates to a seat assembly including a seat structural member such as a frame member. The seat assembly also includes a clip having first and second hook portions and a tab portion. The first hook portion of the clip is attached to the structural member. The seat assembly also includes a trim material having an edge attached to the tab portion of the clip. Preferably, the first and second hook portions are oppositely extending hook portions which form an S-shape.

Various objects and advantages of this invention will become apparent to those skilled in the art from the following detailed description of the preferred embodiments, when read in light of the accompanying drawings.

BRIEF DESCRIPTION OF THE DRAWINGS

FIG. 4 is an enlarged cross-sectional view showing the clip of FIG. 2 attached to an alternate embodiment of a frame member.

FIG. 5 an enlarged cross-sectional view of another alternate embodiment of a frame member of the attachment.

FIG. 6 is an enlarged cross-sectional view of another alternate embodiment of a frame member of the attachment.

DETAILED DESCRIPTION OF THE PREFERRED EMBODIMENT

Figure 1:
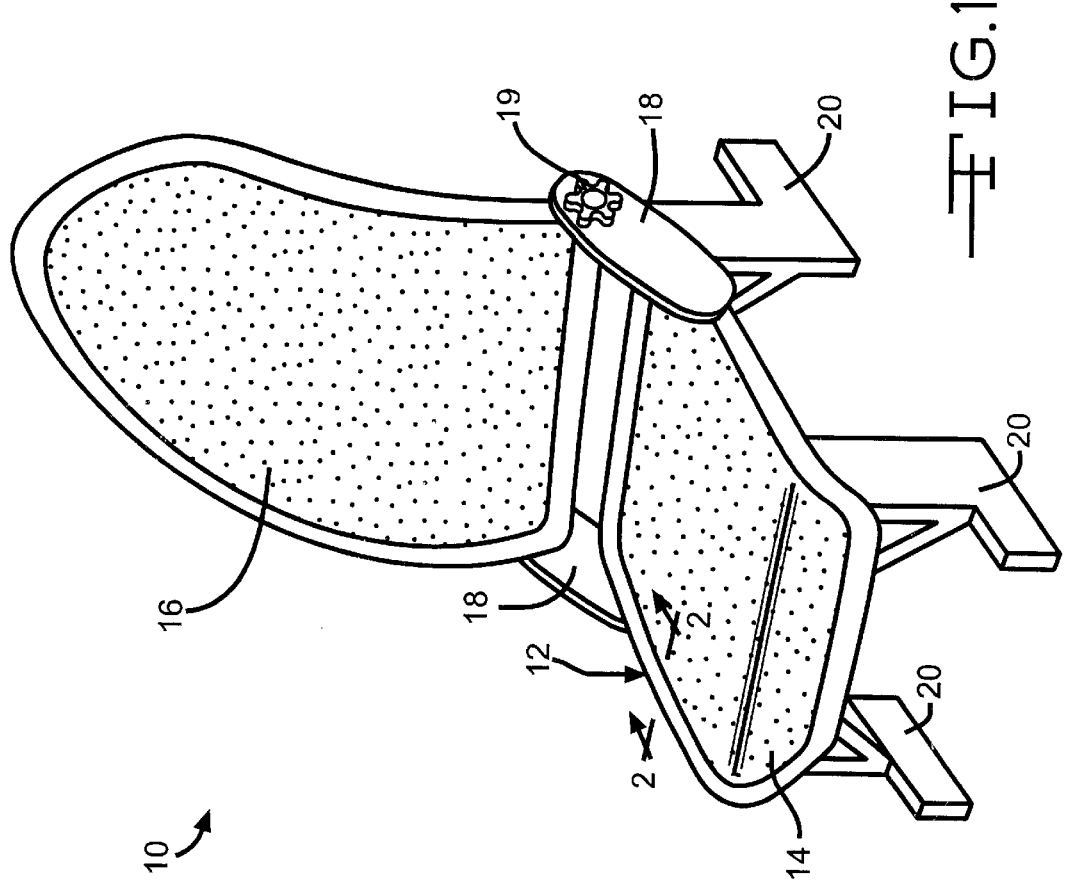
FIG. 1 is a perspective view of a vehicle seat including an attachment for a seat assembly in accordance with the invention.
Figure 2:
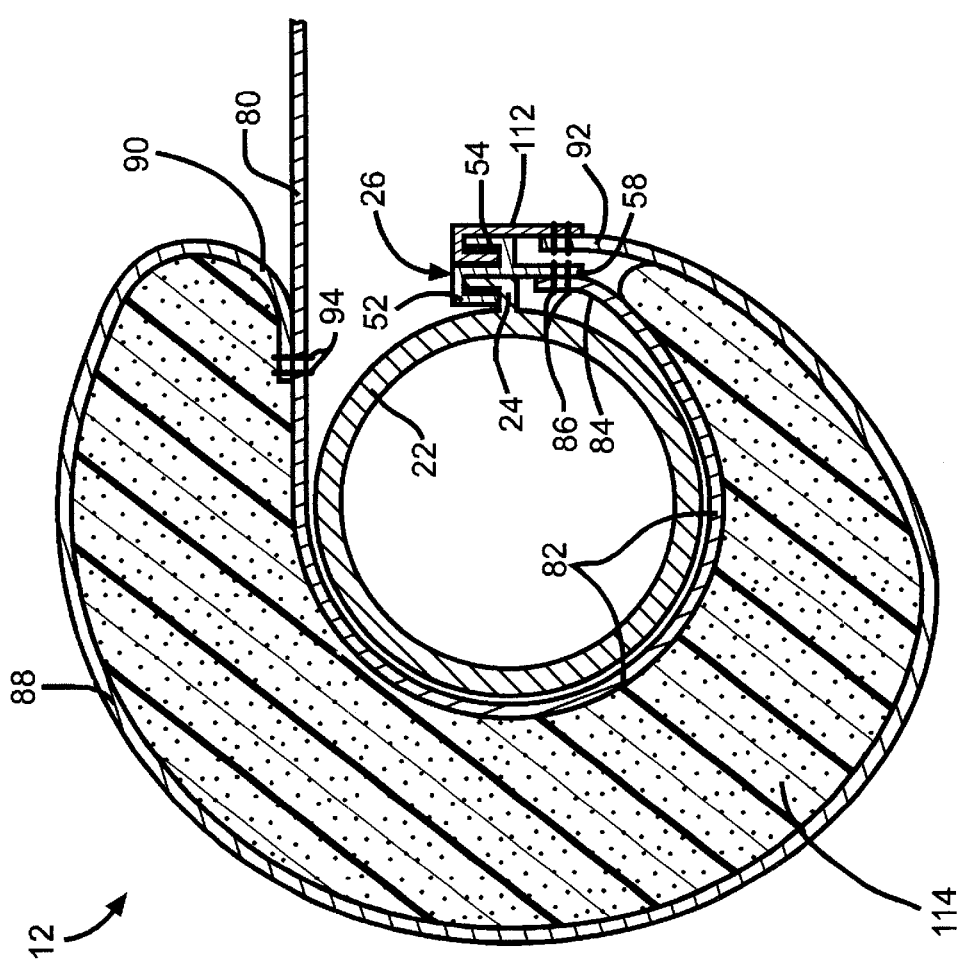
FIG. 2 is a cross-sectional view taken along Line 2—2 of FIG. 1 illustrating an attachment for the seat assembly of FIG. 1 in accordance with the invention.

Referring now to the drawings, there is illustrated in FIGS. 1 and 2 a vehicle seat including an attachment 12 for a seat assembly in accordance with the invention. The illustrated vehicle seat 10 can be used as any type of vehicle seat, such as a lightweight and low cost driver seat or passenger seat of a vehicle, or as a second or third row removable seat in a minivan or a sport utility vehicle. Although the invention is illustrated for use in a vehicle seat 10, it should be understood that the invention can also be used in other types of seats, such as lawn furniture seats and home furniture seats.

The vehicle seat 10 includes a seat bottom 14 and a seat back 16. In the illustrated embodiment, the seat bottom 14 and the seat back 16 are separate structures, but they could also be formed as a single structure. The seat back 16 can be attached to the seat bottom 14 by any suitable means, such as by side connectors 18 shown in FIG. 1. The connectors 18 can include conventional recliner mechanisms, for reclining the seat back 16 relative to the seat bottom 14, such as by operation of a manual adjuster 19. The seat bottom 14 can be mounted on the floor of the vehicle by any suitable means, such as by legs 20 shown in FIG. 1 or a slidable mount (not shown). Preferably, the seat bottom 14 and the seat back 16 are similar in construction; accordingly, only the seat bottom 14 will be described in detail hereinbelow.

The seat bottom 14 includes a frame member 22 configured in the outline of the seat bottom 14 to generally define the outer periphery of the seat bottom 14. The frame member 22 can have any structure suitable for supporting a vehicle occupant in the vehicle seat 10. Usually, the frame member 22 is an elongated tubular member. The frame member 22 can have any suitable cross-section, such as the circular cross-section shown in FIG. 2, a rectangular cross-section, an oblong cross-section, or a C-shaped cross-section. The frame member 22 can be formed from any suitable material, preferably a strong, rigid material such as a metallic material, a composite material, or a strong plastic material. Some preferred metallic materials for use in forming the frame member 22 are aluminum and steel.

Preferably, the frame member 22 has an attachment portion 24. The attachment portion 24 can be any structure which facilitates an attachment of a clip, such as clip 26, to the frame member 22. (The clip 26 is described in detail hereinbelow.) In the embodiment shown in FIGS. 2 and 3, the attachment portion 24 is a hook portion 24 of the frame member 22. The illustrated hook portion 24 extends longitudinally along the frame member 22. The hook portion 24 can be formed as an integral part of the frame member 22, or it can be attached to the frame member 22 by any suitable means, such as welding.

In another embodiment, shown in FIG. 4, the frame member 28 has a cross-section in the shape of a broken circle and the attachment portion 30 of the frame member 28 is an exposed edge 30 of the frame member 28. In another embodiment, shown in FIG. 5, a sleeve 32 having a generally circular cross-section is disposed about the frame member 34, and the attachment portion 36 is a hook portion 36 formed on the sleeve 32. The sleeve 32 and the frame member 34 preferably have corresponding flat portions 38, 40 to prevent rotation of the sleeve 32 about the frame member 34. In a further embodiment, shown in FIG. 6, a sleeve 42 having a U-shaped cross-section is disposed about the frame member 44, and the attachment portion 46 is a hook portion 46 formed on the sleeve 42. The sleeve 42 and the frame member 44 preferably have corresponding flat portions 48, 50 to prevent rotation of the sleeve 42 about the frame member 44. If the frame members 34 and 44 are made of a sufficiently strong material able to support an occupant of the vehicle seat 10, the sleeves 32 and 42 can be made of a less rigid material which can be lighter and less expensive than the material of the frame members 34 and 44. For example, the frame members 34 and 44 can be made of a metallic material and the sleeves 32 and 42 made of a plastic material. Of course, the hook portions 36 and 46 of the sleeves 32 and 42, respectively, should be sufficiently strong to support the clip 26 and the forces transmitted therethrough.

Figure 3:
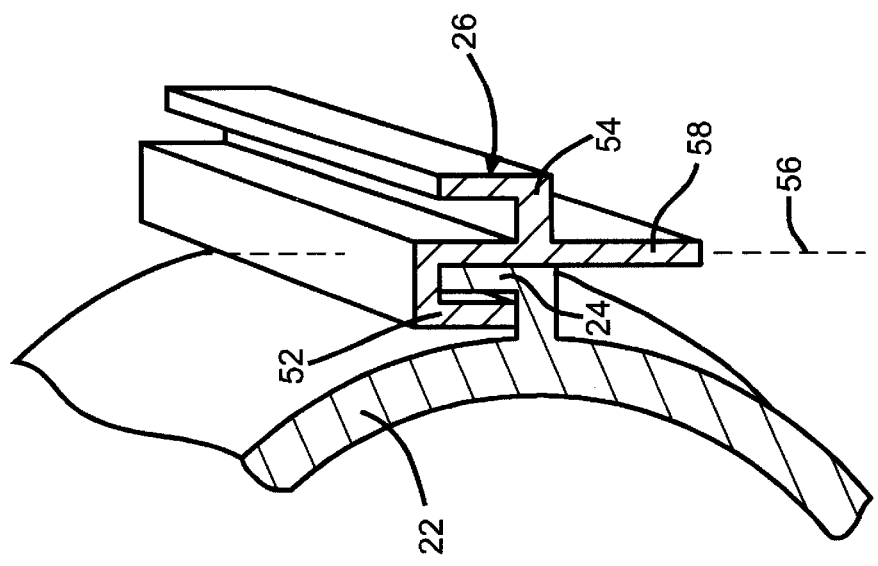
FIG. 3 is a perspective view of a portion of the attachment of FIG. 2, showing a clip attached to a frame member.

As shown in FIGS. 2 and 3, the attachment 12 of the seat assembly also includes the clip 26. In the illustrated embodiment, the clip 26 is attached to the frame member 22 of the vehicle seat 10. However, the clip 26 could also be attached to any other structural member of the vehicle seat 10, such as a support wire (not shown) mounted on the frame member 22. The clip 26 preferably has first and second hook portions 52 and 54. Preferably, the first and second hook portions 52 and 54 are oppositely extending, i.e., disposed on opposite sides of a longitudinal axis 56 of the clip 26 as shown in FIGS. 2 and 3. The first and second hook portions 52 and 54 preferably form a double J-shape or an S-shape. The first hook portion 52 is attached to the frame member 22. Preferably, when the frame member 22 has an attachment portion 24, the first hook portion 52 engages the attachment portion 24 to attach the clip 26 to the frame member 22. Preferably, the clip 26 also has a tab portion 58 or projection, for a purpose to be described below. As shown in FIG. 2, the clip 26 usually has an elongated structure which extends longitudinally along the frame member 22. However, the clip 26 could also be relatively short in length. The clip 26 can be formed from any suitable material, such as a plastic material or a metallic material. Preferably, the clip 26 is formed from a plastic material to avoid metal-to-metal contact between the clip 26 and the frame member 22. Typically, the clip 26 is an elongated plastic extrusion.

Figure 7:
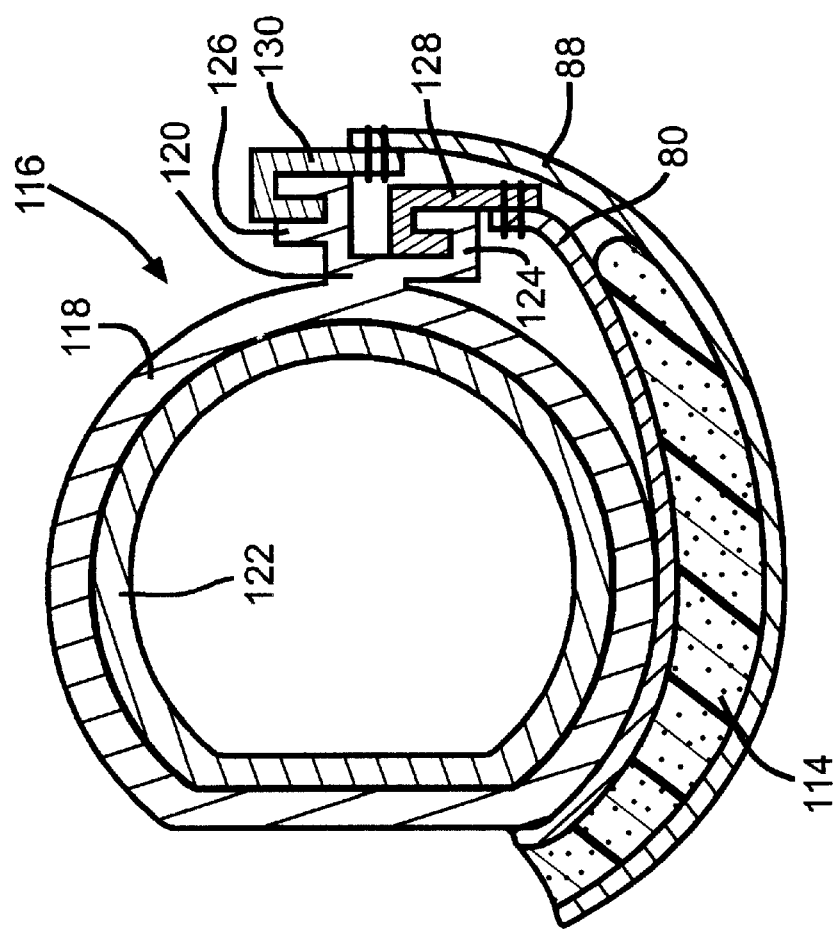
FIG. 7 is an enlarged cross-sectional view of an alternate embodiment of a frame meter and a clip according to the invention.

In the alternate embodiment shown in FIG. 7, the sleeve and clip are integrated into a single structure 116 having a sleeve portion 118 and a clip portion 120. The sleeve portion 118 is disposed about a frame member 122. The clip portion 120 includes first and second hook portions 124 and 126. The first trim material 80 is attached to a hook 128, which in turn is attached to the first hook portion 124. The second trim material 88 is attached to a hook 130, which in turn is attached to the second hook portion 126. The first trim material 80 and the second trim material 88 can be wrapped around the frame member 122 and fastened at the same time.

Referring again to FIGS. 1 and 2, the attachment 12 of the seat assembly also includes a first trim material 80. The first trim material 80 is supported on the frame member 22, and preferably functions as both a trim and a suspension of the vehicle seat 10. The first trim material 80 takes the suspension characteristic of a traditional seat and brings it to the surface. As a result, the vehicle seat 10 is very thin and lightweight, and very breathable with the right selection of the first trim material 80. The first trim material 80 can be formed from any material suitable for performing these functions. Preferably, the first trim material 80 is a sheet of elastomeric material 80. The elastomeric sheet 80 is formed from an elastomeric material which has sufficient strength and elongation to support a vehicle occupant in sitting position in the vehicle seat 10. The elastomeric material should not be rigid or brittle. Some examples of materials suitable for use in the elastomeric sheet 80 include stretchy woven fabrics made from polypropylene, polyethylene, polyester, or other polymers. Preferably, the first trim material 80 looks as good as an automotive grade trim material.

The elastomeric sheet 80 has an edge portion 82 including an edge 84. The edge 84 of the elastomeric sheet 80 is attached to the clip 26 to attach the elastomeric sheet 80 to the frame member 22. When the clip 26 has a tab portion 58, preferably the edge 84 of the elastomeric sheet 80 is attached to the tab portion 58. The edge 84 of the elastomeric sheet 80 can be attached to the tab portion 58 by any suitable means, such as by sewing threads 86 as shown in FIG. 2, by the use of a fastener, or by the use of adhesive. In the illustrated embodiment, the edge portion 82 of the elastomeric sheet 80 is wrapped around the frame member 22. As used herein, the expression "wrapped around" means that the edge portion 82 partially surrounds or extends around at least about 50% of the circumference of the frame member 22. Wrapping the edge portion 82 of the elastomeric sheet 80 around the frame member 80 improves the appearance of the attachment 12 by hiding the frame member 22 and the clip 26 from view, and helps to reduce the stress on the attachment between the edge 84 of the elastomeric sheet 80 and the tab portion 58 of the clip 26.

To secure the first trim material or elastomeric material 80 to the frame member 22, the first hook portion 52 of the clip 26 is simply positioned over the mating hook-shaped attachment portion 24 of the frame member 22. If the first trim material 80 is made of a stretchable material, the first trim material 80 is preferably placed in tension so that the first hook portion 52 of the clip 26 is held or forced against the attachment portion 24 of the frame member 22. During installation, the first trim material 80 is stretched until the first hook portion 52 of the clip 26 can be interlocked with the attachment portion 24 of the frame member 22. Thus, there may be no need to permanently fasten the first hook portion 52 of the clip 26 to the attachment portion 24 of the frame member 22. Of course, the first hook portion 52 could be permanently fastened to the attachment portion 24 if so desired. Thus, the clip 26 provides a rapid and easy method of installing the first trim material 80 to the frame member 22.

Figure 9:
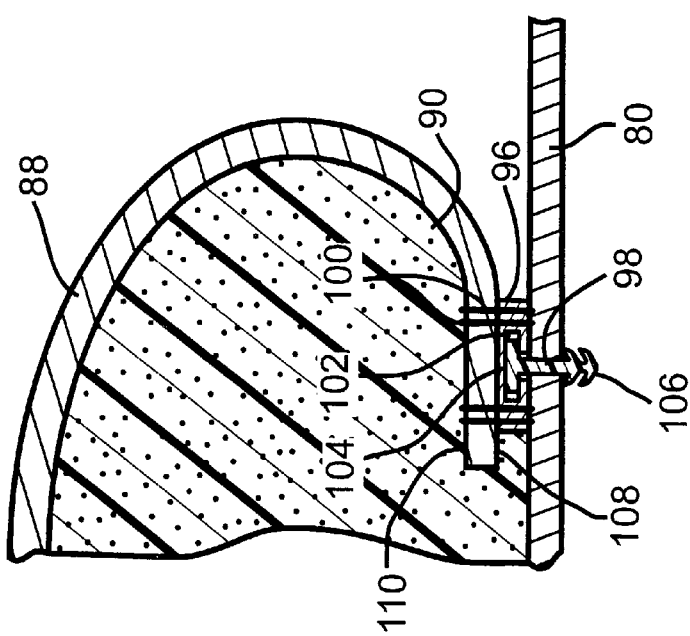
FIG. 9 is a view as in FIG. 8, showing an alternate attachment of the trim material to the elastomeric sheet.
Figure 8:
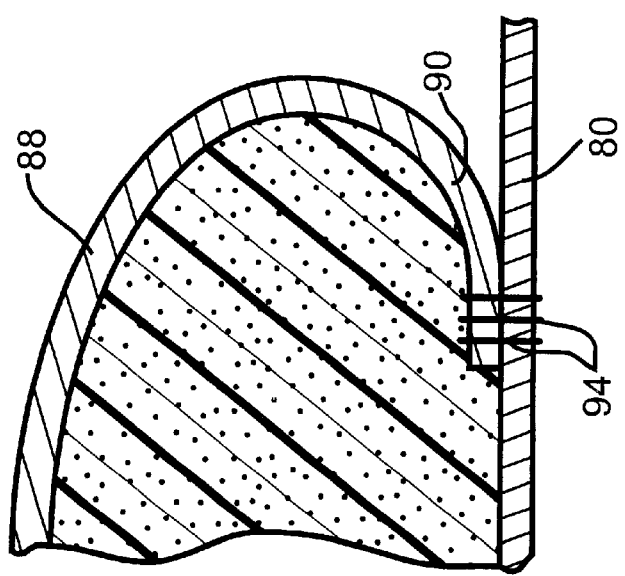
FIG. 8 is an enlarged cross-sectional view of a portion of the attachment of FIG. 2, swing one edge of a trim material attached to an elastomeric sheet.

In the preferred embodiment shown in FIGS. 1 and 2, the attachment 12 of the seat assembly also includes a second trim material 88. The second trim material 88 can be formed from any suitable material, such as any conventional trim cover material. Such materials include, for example, cloth fabric, vinyl and leather. The second trim material 88 has a first edge 90 and a second edge 92. The first edge 90 of the second trim material 88 is attached to the elastomeric sheet 80 by any suitable attachment method. In the embodiment shown in FIGS. 2 and 8, the first edge 90 of the second trim material 88 is attached to the elastomeric sheet 80 by the use of sewing threads 94. In the embodiment shown in FIG. 9, the first edge 90 of the second trim material 88 is attached to the elastomeric sheet 80 by the use of a retainer 96 and a plurality of plug-type fasteners 98 such as Christmas tree-type fasteners 98 (one of which is shown). In the illustrated embodiment, the retainer 96 is attached to the outer side 108 of the first edge 90 of the second trim material 88 by any suitable means, such as by the use of sewing threads 100. Alternatively, the retainer 96 can be attached to the inner side 110 of the first edge 90 to better hide the retainer 96 from view. The retainer 96 extends along the first edge 90 of the second trim material 88, and has a plurality of openings 102 (one of which is shown) at spaced locations along the length of the retainer 96. The heads 104 of the fasteners 98 are inserted into the openings 102 of the retainer 96. The points 106 of the fasteners 98 are then inserted through the elastomeric sheet 80 to attach the first edge 90 of the second trim material 88 to the elastomeric sheet 80. If the elastomeric sheet 80 is a woven sheet having spaced threads, the points 106 of the fasteners 98 can be forced between the threads, as shown in FIG. 9. Alternatively, slots (not shown) can be formed in the elastomeric sheet 80 for insertion of the points 106 of the fasteners 98. Of course, the retainer 96 and fasteners 98 could be integrated into a single structure.

As shown in FIG. 2, the second edge 92 of the second trim material 88 is attached to the second hook portion 54 of the clip 26. Preferably, the second edge 92 is attached to an attachment member 112, which in turn is attached to the second hook portion 54 of the clip 26. In the illustrated embodiment, the attachment member 112 is a hook 112, although it could also be any other suitable member for attaching. The hook 112 engages the second hook portion 54 of the clip 26 to attach the second edge 92 of the second trim material 88 to the clip 26 and the frame member 22. Thus, the clip 26 provides a dual function of attaching the elastomeric sheet 80 to the frame member 22 and providing an attachment site for the second trim material 88. With the first edge 90 of the second trim material 88 attached to the elastomeric sheet 80, the second trim material 88 can be wrapped around the elastomeric sheet 80 and the frame member 22 and fastened to the clip 26 in one motion with the hook 112. This structure thus provides a rapid and easy method of installing the second trim material 88. The second trim material 88 can improve the appearance of the vehicle seat 10.

Preferably, the attachment 12 also includes a cushioning material 114 disposed between the first trim material 80 and the second trim material 88. The cushioning material 114 improves the comfort of the vehicle seat 10 by providing padding or cushioning around the relatively hard frame member 22. A preferred cushioning material 114 is a foam material such as a polymeric foam material. However, any other type of suitable cushioning material could also be used.

Figure 11:
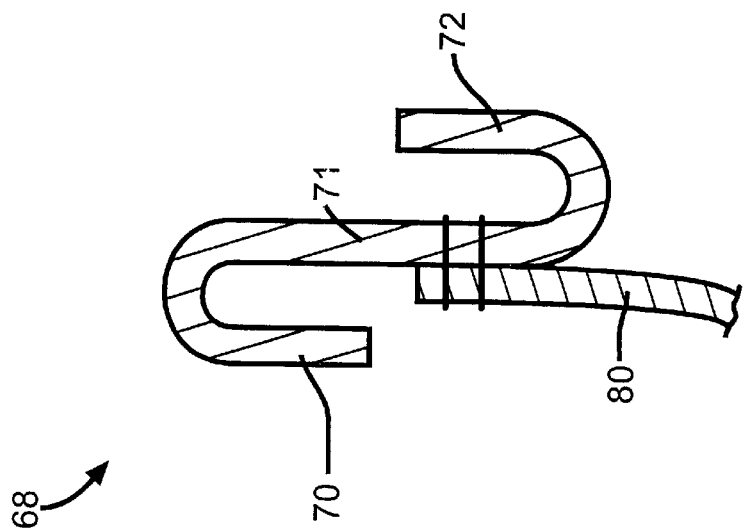
FIG. 11 is an enlarged cross-sectional view of another alternate embodiment of the clip.
Figure 10:
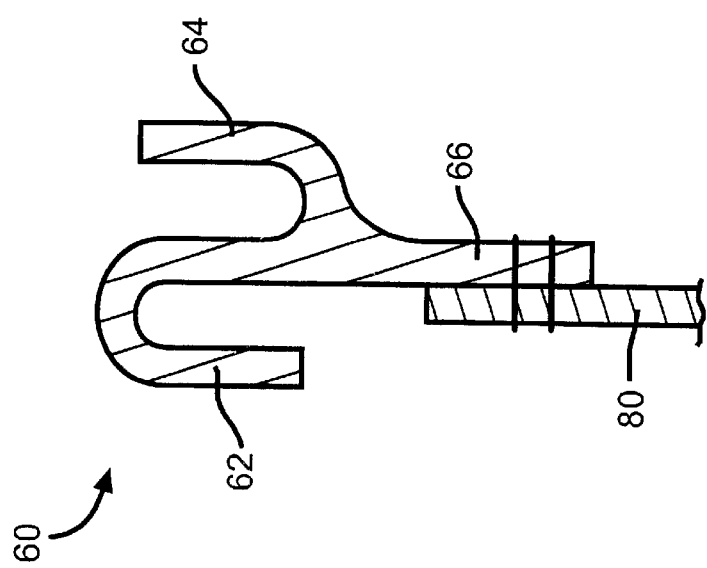
FIG. 10 is an enlarged cross-sectional view of an alternate embodiment of the clip of FIG. 2.

FIGS. 10 and 11 illustrate alternate embodiments of the clip 26. As shown in FIG. 10, the clip 60 has rounded first and second hook portions 62, 64 and an outwardly extending tab portion 66. The tab portion 66 provides an attachment point for joining the first trim material 80 to the clip 60. As shown in FIG. 11, the clip 68 has rounded first and second hook portions 70, 72 at opposing ends of the clip 68. A is central portion 71 disposed between the hook portions 70, 72 can function as a tab portion for joining the first trim material 80 to the clip 68.

Although the attachment 12 of the vehicle seat 10 has been illustrated at the bolster portion (the side portion) of the vehicle seat 10, the attachment could also be located at any other portion of the vehicle seat 10 where the first and second trim materials 80 and 88 are attached to the frame member 22.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A seat assembly having a seat back and a seat bottom comprising:
    a seat structural member defining an outer periphery of one of the seat back and seat bottom;
    a clip having first and second hook portions, the first hook portion attached to the structural member;
    a first trim material being made of an elastomeric material and having an edge attached to the clip, the first trim material functioning as a suspension member for supporting an occupant of said seat assembly; and
    a second trim material having a first edge attached to the first trim material and a second edge attached to the second hook portion.

2. The seat assembly defined in claim 1 further comprising a cushioning material disposed between the first trim material and the second trim material.

3. The seat assembly defined in claim 2 wherein the cushioning material at least partially surrounds the seat structural member.

4. The seat assembly defined in claim 2 wherein the first trim material has an edge portion wrapped around the structural member, and wherein the second trim material is wrapped around the cushioning material and the edge portion of the first trim material.

5. The seat assembly defined in claim 1 wherein the first and second hook portions are oppositely extending hook portions.

6. The seat assembly defined in claim 5 wherein the first and second hook portions form an S-shape.

7. The seat assembly defined in claim 1 wherein the clip is formed from a plastic material.

8. The seat assembly defined in claim 1 wherein the clip has a tab portion and wherein the edge of the first trim material is attached to the tab portion.

9. The seat assembly defined in claim 1 wherein the structural member has an attachment portion, and wherein the first hook portion of the clip is attached to the attachment portion.

10. The seat assembly defined in claim 9 wherein the attachment portion is hook-shaped.

11. The seat assembly defined in claim 1 further comprising a sleeve disposed around the structural member, the sleeve having an attachment portion, and wherein the first hook portion of the clip is attached to the attachment portion.

12. The seat assembly defined in claim 11 wherein the sleeve and the structural member have corresponding flat portions to prevent rotation of the sleeve about the structural member.

13. The seat assembly defined in claim 1 further comprising a retainer fastened between the first edge of the second trim material and the first trim material, to attach the first edge of the second trim material to the first trim material.

14. The seat assembly defined in claim 13 wherein the retainer is fastened to one of the first trim material and the second trim material, wherein the retainer has a plurality of openings, and wherein the seat assembly further comprises a plurality of fasteners mounted in the openings and attached to the other of the first trim material and the second trim material.

15. The seat assembly defined in claim 1 wherein the clip is a first clip and the seat assembly further comprises a second clip attached to the second edge of the second trim material, the second clip having a third hook portion which engages the second hook portion of the first clip to attach the second trim material to the first clip.

16. The seat assembly defined in claim 1 wherein the first trim material functions as both a trim and a suspension of the seat assembly, such that a separate cushioning material is not disposed adjacent said first trim material entirely between outer peripheral members of the seat structural member.

17. The seat assembly defined in claim 1 wherein the first edge of the second trim material is attached to the first trim material by sewing.

\* \* \* \* \*